July 20, 1954 E. E. TESSNEER ET AL 2,684,018
INDEXING WORK FIXTURE
Filed April 27, 1951 5 Sheets-Sheet 2

INVENTORS:
Ezra E. Tessneer
Allen D. Gunderson
BY Peck & Peck
ATTORNEY

July 20, 1954  E. E. TESSNEER ET AL  2,684,018
INDEXING WORK FIXTURE

Filed April 27, 1951  5 Sheets-Sheet 3

INVENTORS:
Ezra E. Tessneer
Allen D. Gunderson
BY Peck & Peck
ATTORNEYS

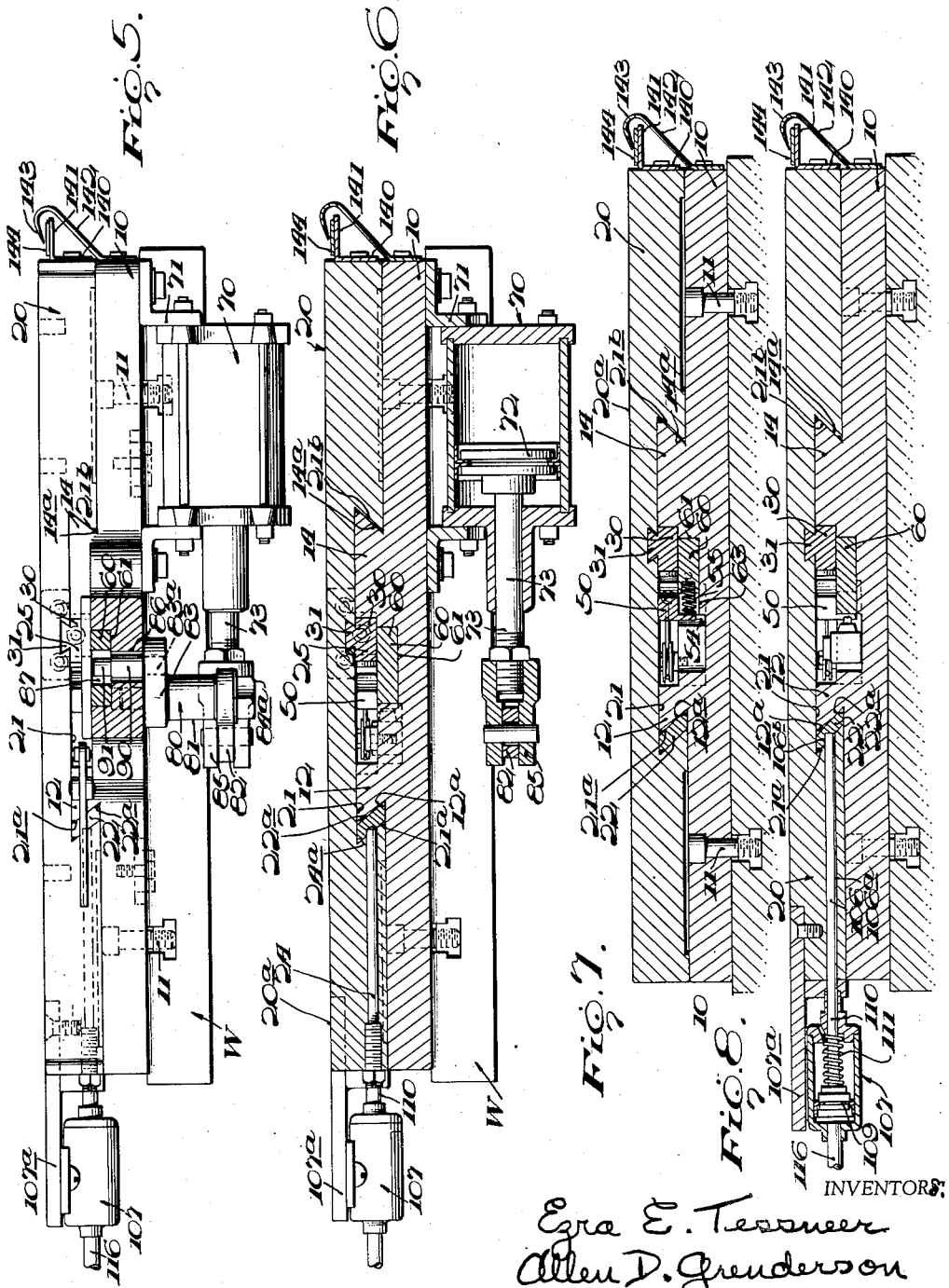

July 20, 1954  E. E. TESSNEER ET AL  2,684,018
INDEXING WORK FIXTURE
Filed April 27, 1951  5 Sheets-Sheet 5
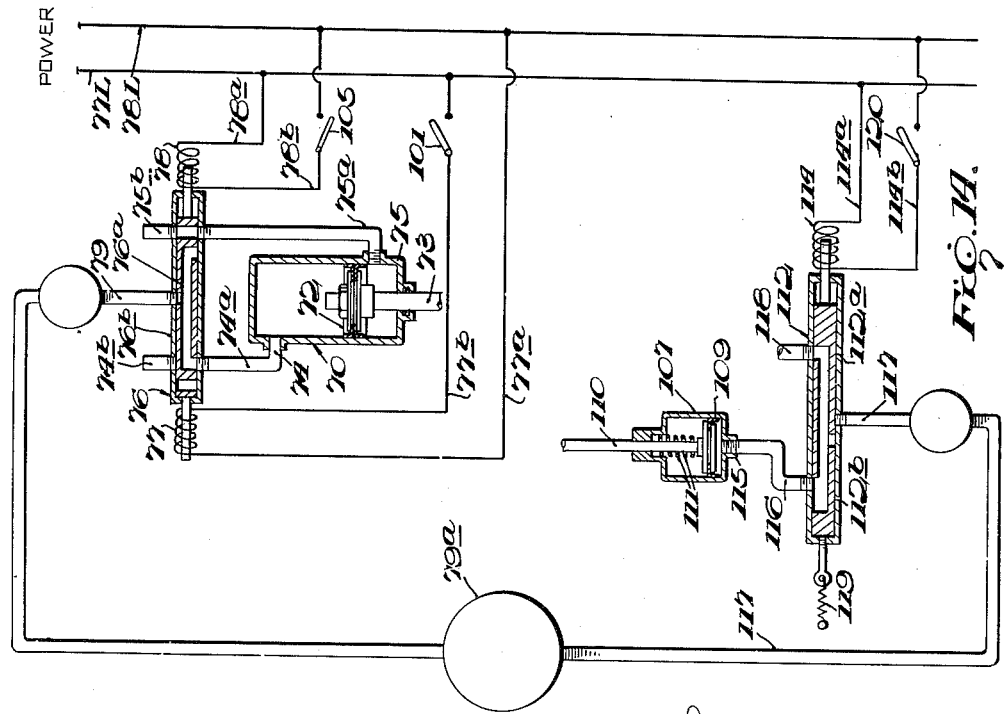
INVENTORS:
Ezra E. Tessneer
Allen D. Gunderson
BY Peck + Peck
ATTORNEYS Patented July 20, 1954

2,684,018

UNITED STATES PATENT OFFICE 2,684,018

INDEXING WORK FIXTURE

Ezra E. Tessneer and Allen D. Gunderson, Racine, Wis., assignors to George Gorton Machine Co., a corporation of Wisconsin Application April 27, 1951, Serial No. 223,252

14 Claims. (Cl. 90—56)

This invention relates to indexing work fixtures of the types particularly adapted, although not limited, to mounting on the work table of an engraving or the like machine tool; and the nature and objects of the invention will be readily understood by those skilled in the art in the light of the following explanation and detailed description of a preferred embodiment or mechanical expression of our invention, from among various other embodiments, expressions, forms, designs, constructions and combinations of which the invention is capable within the broad spirit and scope thereof as defined by the appended claims.

It is a primary object of our invention to provide an indexing work fixture by which a work piece may be indexed with precision successively to predetermined positions of index relative to a tool adapted to operate upon the work piece.

Another object is to provide such an indexing work fixture as a unitary organization for removable mounting as a unit on the work table of a machine tool or other support structure.

Another object is to provide such a fixture which will adjust itself automatically for indexing with precision of positioning through successive positions of index having different spacings therebetween.

A further object is to provide a work indexing fixture adapted for the mounting thereon interchangeably of any one of a plurality of index controlling members each of which provides for indexing by the fixture through a series of indexing positions having spacings therebetween different from the spacings between the indexing positions provided for by the other of said controlling members.

A further object is to provide for operator controlled, powered operation of such an indexing fixture automatically through a cycle of indexing from one position of index to the next position of index.

Another object is to provide such an indexing fixture in which the fixture is releasably locked automatically in each position of index and is unlocked automatically for indexing from one position to the next.

Another object is to provide an indexing fixture indexible step by step through a succession of index positions by an indexing mechanism operable through an index stroke, and a return stroke the length of which is determined automatically by the spacing between successive positions of index.

Another object is to provide an efficient powered operating system and electrical control circuits therefor for operating an indexing work fixture through an indexing cycle of movement from one position of index to the next position under the control of an operator.

And a further object is to provide such an indexing fixture and its operating system as a unit particularly adapted for removable mounting on the work table of a multiple spindle engraving machine for engraving simultaneously a plurality of work pieces mounted on the indexing fixture as such work pieces are moved by said fixture to successive positions of index.

With the foregoing and various other objects, features and results in view which will be readily apparent from the following detailed description and explanation, our invention consists in certain novel features in design and construction of parts and elements and in combinations and sub-combinations thereof, all as will be more particularly referred to hereinafter.

Referring to the accompanying drawings in which similar reference characters refer to corresponding parts and elements throughout the several figures thereof:

Fig. 5 is a view in front elevation of the work fixture of Fig. 2, the fixture being shown as though removed from the work table of the engraving machine of Fig. 1.

Fig. 6 is a transverse vertical section taken as on the line 6—6 of Fig. 2.

Fig. 7 is a vertical section taken as on the line 7—7 of Fig. 2.

Fig. 8 is a vertical section taken as on the line 8—8 of Fig. 2.

Fig. 9 is a fragmentary, enlarged detailed view of an indexing bar showing the inner end, transverse head thereof and several of the teeth of the series of indexing teeth thereon.

Fig. 10 is a view similar to Fig. 9, but of an-

3 other indexing bar having a series of teeth thereon of different spacing therebetween than the spacing between the teeth of the bar of Fig. 9.

Fig. 11 is a detail, enlarged view in top plan showing the indexing pawl and the pawl carrier and indexing bar therefor at the completion of an indexing stroke.

Fig. 12 is a view similar to Fig. 11, but showing the pawl in position riding over the end of a tooth on the return stroke of the pawl and its carrier bar.

Fig. 13 is a view similar to Fig. 12 but showing the pawl in position engaging in a notch of the indexing bar at the end of the return stroke and with the tail of the pawl engaged with the switch for effecting the indexing stroke of the pawl and its carrier bar.

Fig. 14 is a diagrammatic view of the air cylinder units and controlling air valves with the compressed air supply system therefor, and of the air valve controlling solenoids and their circuits with the controlling switches therefor in such circuits.

Figures 2, 15:
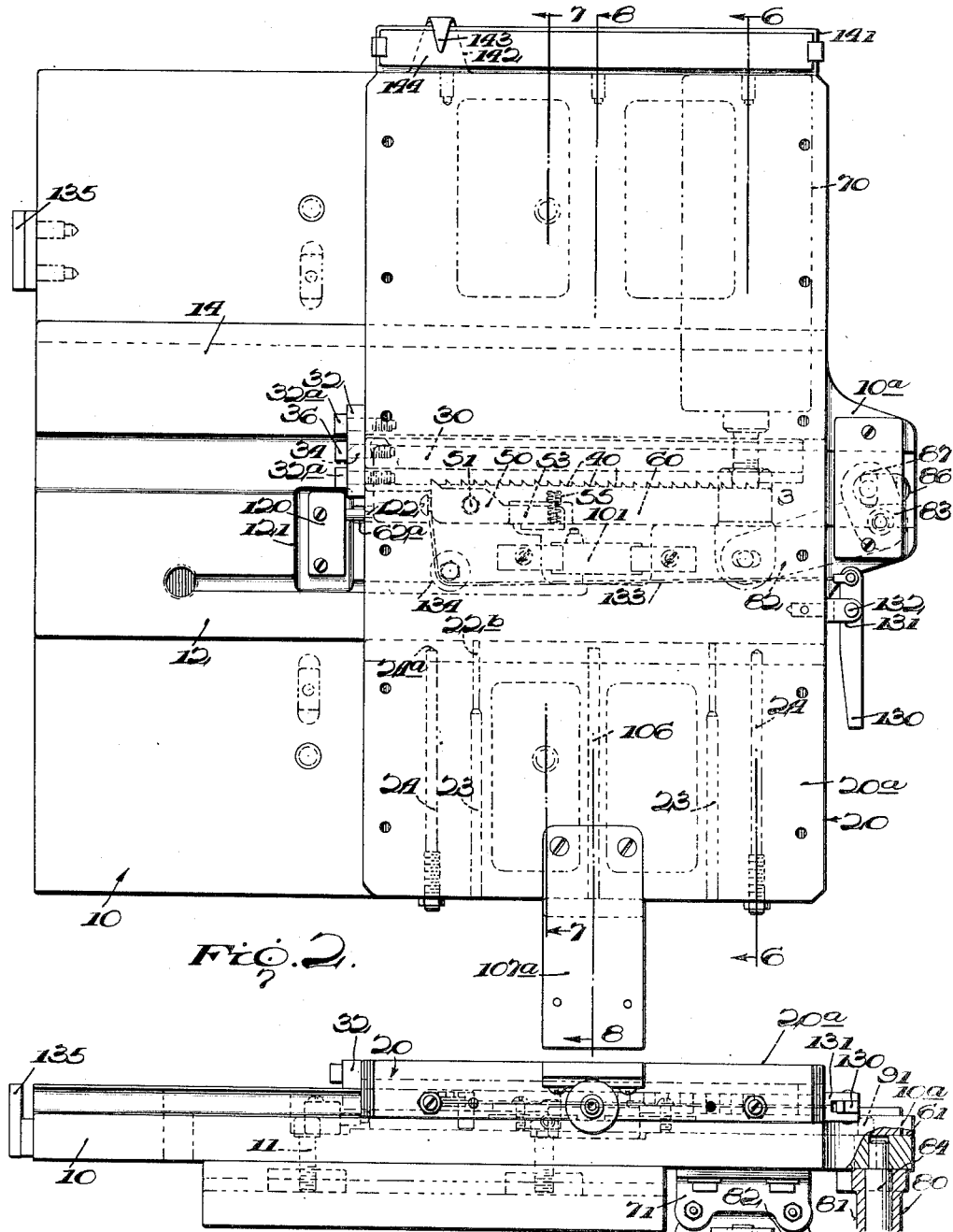
Fig. 2 is a view in top plan of the indexing work fixture of Fig. 1, the work mounting table thereof being shown in position for the start of indexing movements thereof through a series of indexing positions.
Figure 3:
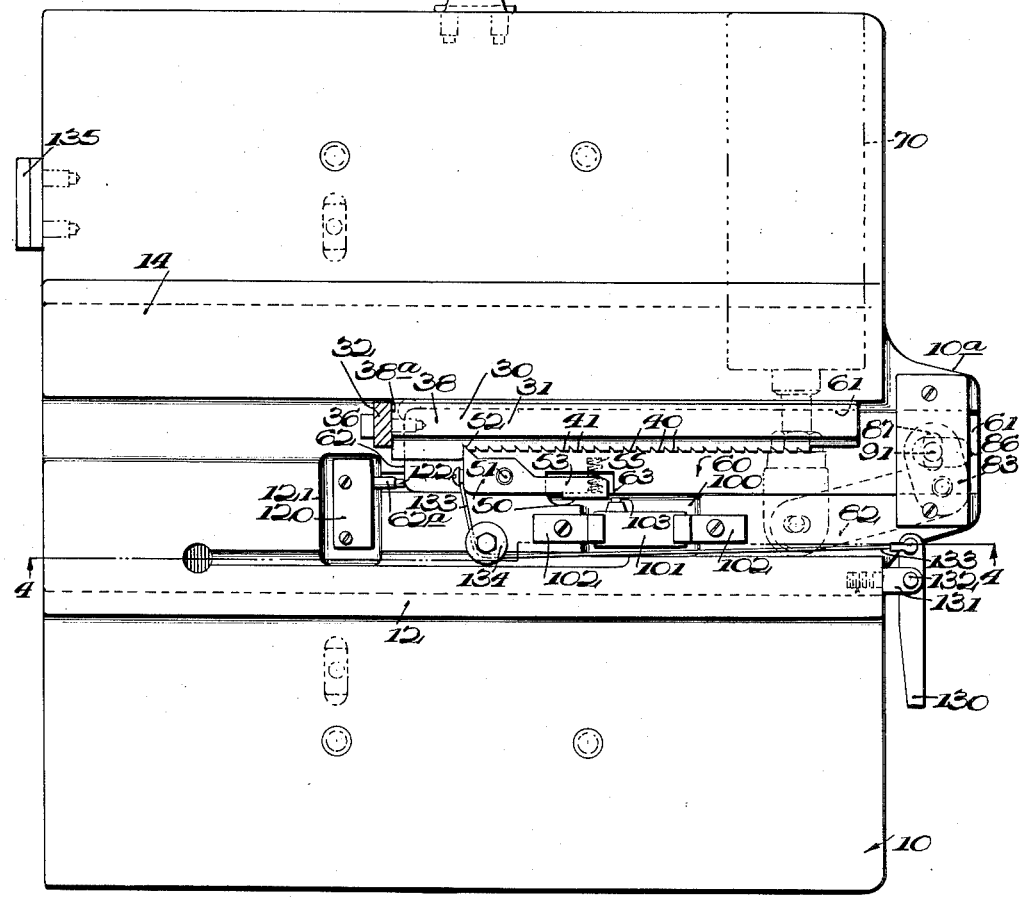
Fig. 3 is a view in top plan of the support base or bed of the work indexing fixture of Fig. 2, with the fixture table removed to show in top plan the indexing pawl and carrier bar therefor of the indexing mechanism.

Fig. 15 is an end elevation taken from the left hand end of the work indexing fixture of Fig. 2.

An indexing work fixture of our invention has found particular utility with a multiple spindle engraving machine of the tracer controlled pantographic type for engraving various symbols, indicia and the like simultaneously on a plurality of work pieces. Hence, we have selected as an example form for purposes of explanation, an indexing work fixture unit embodying our invention of a form for use with such types of multiple spindle engraving machines by which the work pieces may be indexed automatically under the control of the operator to successive positions of index for engraving at spaced intervals along the work pieces. However, by the illustrated form of indexing work fixture unit of the selected example, we do not intend or desire to limit our invention to such particular form or to use with engraving machines of the illustrated type. The various features of an indexing work fixture of our invention, including that feature by which the indexing mechanism adjusts itself automatically to the spacings between successive positions of index of different series of index spacings, and that feature by which different indexing control members are utilized for obtaining the spacing between different series of index spacings, are readily adaptable to embodiment in various other forms, designs and arrangements for work piece indexing with various types of machine tools, as will be more fully explained in detail hereinafter.

Figure 1:
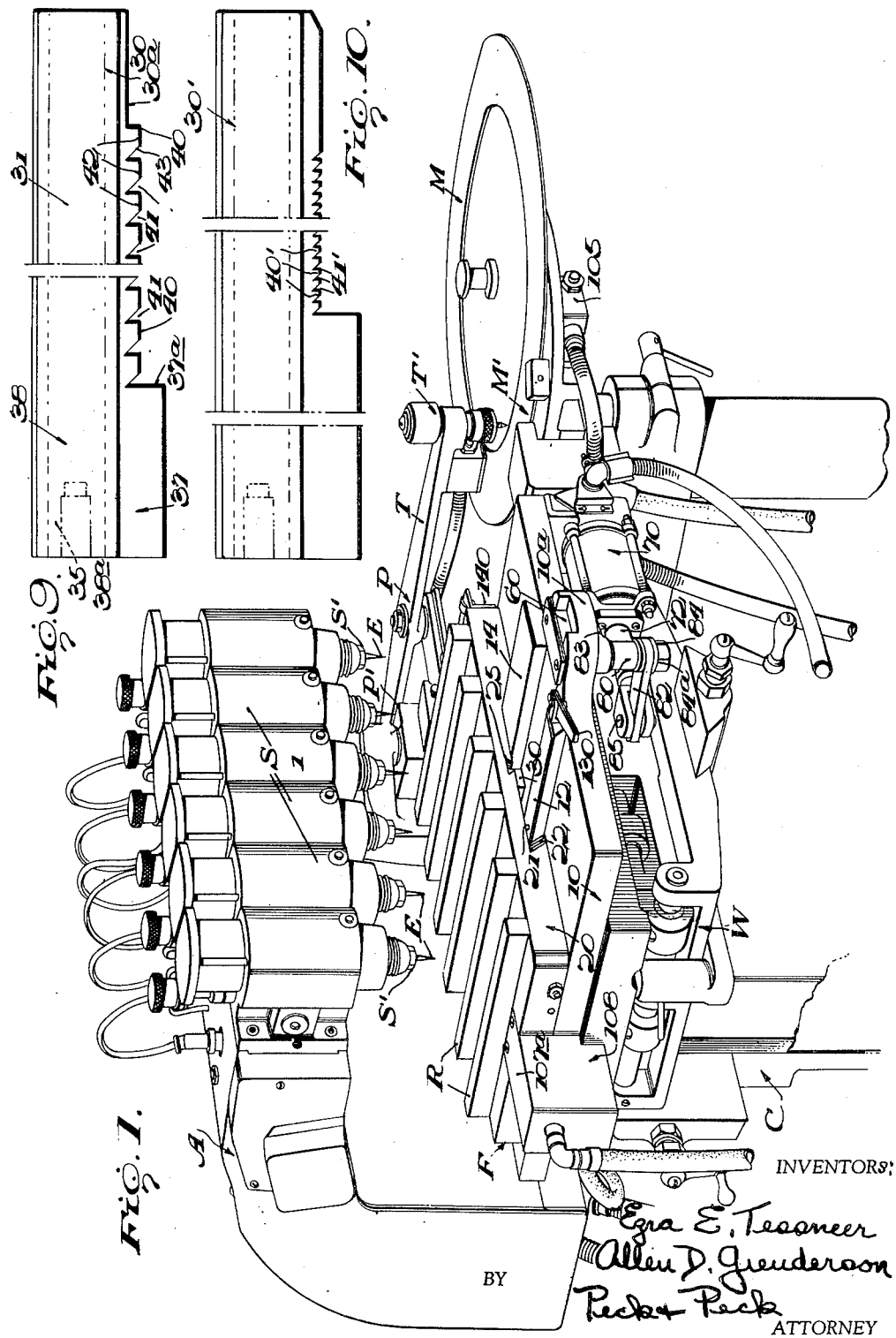
Fig. 1 is a perspective view of a multiple spindle engraving machine of the tracer controlled, pantographic type having mounted thereon a work indexing fixture organization of our invention, a plurality of work pieces being shown in mounted position on the work fixture.

A multiple spindle engraving machine of a type for which the selected example form of the invention is particularly designed, is illustrated in Fig. 1 of the accompanying drawings. Such machine includes a supporting frame structure which may be in the form of a vertical column C, a portion only of which is shown. On this column C there is mounted a work table organization W of the so-called duplicator type in which the table W is mounted in horizontally disposed position for universal lateral movements in a horizontal plane. Such a duplicator table may, for example, be of the general type disclosed in the U. S. Patent 2,005,696, dated June 18, 1935, to which patent reference may be had for an understanding of the operation of the work table W. The column C mounts or provides at the upper end thereof to the rear of work table W, a forwardly extended overarm A

4 which mounts on and across the forward side thereof, a series of vertically disposed, motorized spindle units S, there being six (6) of such units in the illustrated machine. These units S are positioned by overarm A above work table W and each unit includes a rotary spindle S' which is formed at the lower end thereof to detachably mount therein a rotary engraving tool E.

At the right hand, forward side of work table W there is supported from column structure C a pattern or copy table M, which in this instance happens to be of the circular type mounted for rotation in a horizontal plane about a vertical axis. A pantograph unit P is pivotally hung at P' from the frame structure of the machine at the right hand side of work table W and is in turn pivotally coupled with the adjacent, right end of the work table W. Pantograph unit P includes a forwardly extended tracer arm T which mounts at its forward, free end a vertically disposed tracer unit T'. The tracer unit T' is located above the side of copy table M adjacent work table W and is adapted to be manually moved universally laterally by an operator in tracing a suitable master M' mounted on the upper side of the copy table and moved by that table to position below the tracer unit. Thus, as will be readily understood by those familiar with this general type of tracer controlled, pantographic engraving machine, movements laterally of the tracer unit T' over a master M' to trace or scan the design thereof, are transmitted by the pantograph P to the work table W as movements laterally of the work table W through a horizontal plane in accurately scaled reduction of the movements of the tracer unit T' in scanning or tracing the master.

In the operation of the example machine of Fig. 1 to engrave on suitable work pieces, an accurately scaled reproduction of the design presented by a master M', the work is secured on table W in positions below the spindle units and the copy table M is then rotated to position the desired master M' on the table below the tracer unit T'. The operator then scans or traces the design on master M' with the tracer T', and in so doing the tracer arm T actuates the pantograph P which in turn transmits to the work table W the exact movements of tracer T' but in accurately scaled reduction of the tracer movements. Such movements of work table W will move the work pieces thereon relative to the laterally fixed cutting tools E, respectively so that these tools engrave simultaneously on the work pieces reproduction of the design on master M' being traced by tracer T'.

In the form of indexing work fixture of the selected example of our invention, such fixture being identified generally by the reference character F, the fixture is comprised of a unitary organization which is detachably mounted and secured in operative position on the work table W for universal lateral movements as a unit therewith as such table is moved by the pantograph P in tracing a master. In this example the indexing work fixture unit F comprises a bed or base plate 10 and a work piece mounting, indexable table 20 slidably mounted and confined thereon for movements in either direction along a straight-line path transversely thereof. The bed or base plate 10 is of generally rectangular plan form and is adapted to be detachably mounted and secured in fixed position on and over the work table W for universal lateral movements therewith. Bed 10 may be removably secured and attached in position on work table W by the usual securing bolts 11 adapted to be received in the usual T-slots formed in the upper side of a work table W.

The indexable work table 20 of the work fixture unit F is of rectangular plan form and provides, in this instance, a flat upper surface 20a for clamping thereon a plurality of work pieces R in positions to be located below the engraving cutters E, respectively, of spindle units S for operative cutting or engraving engagement of those cutters with the work pieces. As the example machine is provided with six (6) spindle units S, the work table 20 is adapted to mount thereon six (6) work pieces for simultaneous engraving operations by the engraving cutters E of the spindle units S, respectively. However, any lesser number of work pieces may be mounted on work table 20 for engraving operations thereon by a similar number of the spindle units S. The fixture work table 20 is in this example designed and arranged for movements in either direction along a straight line path disposed in and out relative to the machine, that is from front to rear thereof, in order to permit of engraving a series of designs or indicia spaced apart at intervals along the longitudinal lengths of the work pieces R which are secured in positions disposed transversely across the fixture table, that is from front to rear of the machine, as will be clear by reference to Fig. 1. Work pieces R may be removably secured in position on the table 20 by any suitable clamps or the like, with the work pieces being spaced apart in a parallelism beneath and aligned vertically with the cutters E.

In the example embodiment the fixture work table 20 has a width, that is a front to rear dimension, less than the width or front to rear dimension of the bed 10. The bed 10 in this instance has a width or front to rear dimension greater than the front to rear dimension of the universally laterally movable work table W of the machine, so that bed 10 in mounted position on work table W extends a distance substantially forwardly beyond the forward edge of table W. The fixture table 20 in position at the start of an indexing cycle, is displaced forwardly on bed 10 to a position with its forward edge located in or in close proximity to the vertical plane passing through the forward edge of bed 10. This starting position of fixture work table 10 is shown in Fig. 2. From this starting position table 20 is progressively moved rearwardly step by step through a succession of index positions until it reaches a position at the conclusion of the indexing cycle in which its rear edge is adjacent the rear edge of bed 10. Such position of fixture table 20 is shown in Fig. 1 of the drawings.

The bed 10 is formed or provided on the upper side thereof with the spaced, parallel slides or rails 12 and 14 disposed transversely thereacross and extending from front to rear thereof to form a dovetail slide defining the straight line path along which the fixture work table 20 is to be moved in either direction, that is from front to rear relative to the machine. The fixture work table 20 is provided at the underside thereof with a dovetail slideway 21 cut or otherwise formed therein to extend from front to rear thereof. This slideway 21 provides along the opposite, longitudinal sides thereof the spaced, parallel bearing surfaces 21a and 21b for sliding bearing engagement with the opposite undercut bearing surfaces 12a and 14a, respectively, provided along the outer sides of the spaced rails 12 and 14 on bed 10, as clearly shown by Figs. 6, 7 and 8. Fixture table 20 is slidably mounted and confined on the bed 10 by the slides 12 and 14 which are received and slidably fitted into the dovetail slideway 21, so that the table is then freely slidable on and along but constrained to a straight-line path of movement transversely across bed 10, in and out relative to the machine.

In this instance, a gib 22 is provided mounted in position between the undercut bearing surface 12a of slide 12 and the undercut surface 21a of the dovetail slideway 21. The inner surface 22a of this gib 22 provides the bearing surface for slidable engagement with and along bearing surface 12a, as will be clear by reference to Figs. 6, 7 and 8. The gib 22 is coupled with fixture table 20 for movements therewith as a unitary component, being held against any movements longitudinally relative to the table but being mounted for play or slight movements laterally in either direction relative to the table and toward or from the slide bearing surface 12a. This mounting of gib 22 may be effected by an arrangement of spaced pins 23 mounted in and extending through table 20 with their inner ends projected beyond undercut surface 21a of slideway 21 and being slidably received in suitable bores 22b respectively formed in gib 22. If desired suitable adjustment screws 24 may be provided in and extended through table 20 with their inner ends projected beyond under 21a and being received in suitable recesses 24a in the adjacent side of the gib to limit outward movement of the gib by abutment against the inner ends walls of the recesses. Thus, the gib has sufficient play laterally between surface 21a of slideway 21 and surface 12a of slideway 12 to permit of lateral displacement thereof to and from a locking position clamped against surface 12a to thereby releasably lock table 20 against movements on and relative to bed 10.

We provide indexing mechanism under the control of an operator for indexing the fixture work table 20 from its starting position at the forward side of bed 10, inwardly over and across the bed step by step through successive positions of index. In this manner the work pieces R may be indexed inwardly or rearwardly across bed 10 relative to the rotary engraving tools E of the laterally fixed spindle units S of the machine to thereby enable the cutters E to engrave at spaced intervals along the work pieces R a scaled reduction of the designs of a master M' selected by the operator for reproduction. In any indexed position of the fixture table 20 on bed 10, the bed 10 and table 20 are universally laterally movable as a unit with the work table W relative to laterally fixed cutters E under the control of tracer T' and pantograph P.

The indexing mechanism includes an indexing bar or member 30 which is removably mounted and secured in the underside of fixture table 20 in position disposed longitudinally of and through the slideway 21. In this particular adaptation of our invention, the indexing bar 30 is provided along its upper side with a dovetail rib 31 which extends from end to end of the bar. A dovetail groove 25 is provided in the fixture table 20 at the underside thereof within the slideway 21, with this groove opening along its lower side into the slideway 21 and at its opposite front and rear ends opening through the front and rear edge walls, respectively, of the fixture table. The groove 25 is positioned offset to the right from the longitudinal center of slideway 21, so that, in mounted position of fixture table 20 it is located along and adjacent the slide rail 14 of the bed 10. An indexing bar 30 is removably mounted in position on fixture table 20 by inserting the dovetail rib 31 thereof into the dovetail groove 25 and then sliding the bar rearwardly until the inner or rear end thereof is substantially flush with the rear edge surface of the fixture table 20. The indexing bar 30 has a width for the major portion of its length such that the outer vertical side thereof has close operating clearance along the adjacent vertical edge surface of slide rail 14, while the opposite inner side of the bar is disposed approximately along the longitudinal center of slideway 21. The width of the rear or inner end portion of an indexing bar 30 is increased by a laterally inwardly extended portion 37 to thereby provide an increased width transverse head 38 thereacross with the forward end wall of extension 37 providing a vertical, flat abutment surface 37a and the head 38 providing across the rear end thereof a vertical abutment surface 38a.

An indexing bar 30 is removably attached in mounted position by means of a plate fixture 32 which is secured in vertically disposed position against the rear edge of the fixture table 20, across and closing the rear, open end of dovetail groove 25. Plate 32 may be secured in position by suitable spaced machine screws 32a threaded into table 20. The plate 32 is provided with a transverse bore 34 therethrough located in position between screws 32a for axial alignment with an internally threaded bore 35 in and opening through the rear surface 38a of the end head 38 of the bar 30. An attachment screw 36 is provided for insertion through the bore 35 of the plate 32, and for threading up into bore 35 to thereby draw the bar 30 to and secure it in its mounted position with the abutment surface 38a of head 38 engaged against the adjacent vertical surface of the attachment plate 32. Thus attached in mounted position at the underside of table 20 within slideway 21, the indexing bar 30 is fixedly secured against movement or displacement relative to the table and is movable therewith as a unit. An indexing bar 30 may be readily removed from mounted position by unscrewing the attachment screw 36 to release the bar, and then drawing the bar outwardly until the dovetail rib 31 thereof is clear of groove 25 with the bar thus completely detached and removed from the table 20.

An indexing bar of our invention, such as the bar 30 herein illustrated referring now to Figs. 2 and 9, is provided along its inner, vertical longitudinal edge 30a with a series of indexing teeth 40. Teeth 40 are spaced precise distances apart along the bar edge 30a and extend laterally outwardly and horizontally on bar 30. The teeth 40 are formed and defined by notches 41 cut into the bar 30 through the bar edge 30a thereof. Notches 41 are so shaped as to form at the front or forward side of each tooth 40 a vertically disposed surface 42 in a plane perpendicular to the longitudinal axis of the bar, and to form at the rear side of each tooth a rearwardly and inwardly inclined or sloping surface 43 which extends from the outer edge of that tooth to the inner end of the surface 42 at the forward side of the next adjacent rearwardly located tooth, as will be clear by reference to Fig. 9. The inclined or sloping surface 43 at the rear of each tooth is in the present example inclined at an angle of 45° to the longitudinal axis of the bar 30. With the bar 30 in mounted position, the teeth 40 thereof extend along the inner edge 30a of the bar with the most forwardly located tooth 40 of the series spaced inwardly a distance from the front end of the bar and with the rearmost tooth 40 of the series spaced forwardly the width of a notch from the abutment wall 37a of the head-forming lateral extension 37 at the inner end of the bar. Obviously, any lesser number of teeth may be provided if desired having the spacing therebetween of the teeth 40 of the series thereof provided on bar 30 of the illustrated example.

An important feature of an indexing work fixture of our invention resides in the provision of interchangeable indexing bars each having thereon a series of indexing teeth having a different tooth spacing therebetween. In carrying out this feature we may, as in the present example, provide a plurality of indexing bars for interchangeable mounting on fixture table 20, with each bar having a different tooth spacing, so that the fixture table 20 may be indexed to successive index positions spaced apart precisely in accordance with the tooth spacing of the particular indexing bar mounted on the table. The indexing bars, except for the number of teeth and the spacing therebetween, are identical in design, construction and dimensions, that is in the present example, identical with the indexing bar 30. For instance, we have shown in Fig. 10 a portion of an indexing bar 30' which is identical with bar 30 except that adjacent indexing teeth 40' thereon with the notch 41' therebetween are spaced apart a distance equal to approximately one-half ($\frac{1}{2}$) of the distance or spacing between adjacent teeth 40 of the indexing bar 30. Thus, by removing bar 30 from mounted position on fixture table 20 and replacing it with the indexing bar 30', the indexing fixture table 20 will be indexed step by step through successive positions of index which are spaced apart precisely in accordance with the spacing of the teeth 40', that is, a distance between index positions of approximately one-half ($\frac{1}{2}$) the distance between the index positions for the table 20 when indexed by and under the control of the indexing bar 30. These interchangeable indexing bars may be provided with any desired number of teeth and tooth spacing for the series of teeth of each bar, within the limits of course, of the indexing range of the particular indexing fixture unit with which the bars are to be used.

The step by step indexing of the fixture work table 20 is effected through the medium of the indexing bar mounted thereon, such for example as the indexing bar 30, in operative association with an indexing pawl 50 pivoted on a reciprocating slide or carrier bar 60. Carrier bar 60 is mounted on bed 10 for engaging a tooth of the indexing bar on the indexing stroke of the carrier bar 60 and for positioning by that bar on its return stroke for engagement with an adjacent tooth by the next indexing stroke of the carrier bar.

Referring now to Figs. 3, 6, 7 and 8, the bed 10 is formed with a forwardly extended bracket forming extension 10a across the intermediate front portion thereof, and a groove or slideway 61 is provided in the bed 10 disposed transversely thereof between guideways 12 and 14. Slideway 61 extends forwardly to and opens through the forward end of the bracket extension 10a. This slideway 61 is located along and adjacent guide rail 14 below the indexing bar 30 mounted on table 20, and is open at its upper side throughout its length and width. The slideway 61 is of rectangular cross section with a width greater than the width of an indexing bar 30, so that the slideway extends throughout its length a substantial distance inwardly beyond the inner toothed edge 30a of the indexing bar 30. The slideway 61 is parallel with guide rails 12 and 14 and with the straight line path of table movement defined by those guideways. Slideway 61 extends a distance inwardly or rearwardly along the bed between guide rails 12 and 14. Slideway 61 is closed at the inner, rear end thereof by a transverse vertical wall provided by the body of bed 10 which wall presents a vertical abutment surface 62 across the inner end of the slideway in a plane perpendicular to the longitudinal axis of the slideway. The pawl carrier bar 60 is of rectangular cross section with a width to be slidably fitted and received in slideway 61 and a thickness of depth such that the upper planar surface 60a thereof lies in the plane of the bottom or lower surface of the bed 10 between guide rails 12 and 14. Thus, the pawl carrier bar 60 is mounted for reciprocation beneath and freely independently of the indexing bar 30, and has a width such that it extends throughout its length for a distance inwardly beyond and clear of the indexing bar to present an unobstructed upper planar surface along the inner side of the indexing bar in the plane of the under surface of the latter bar.

The pawl 50 is pivotally mounted on the upper side of carrier bar 60 at a location spaced inwardly a distance from the inner end thereof, for horizontal rocking about a fixed pivot pin 51, toward and from the teeth 40 along the adjacent edge 30a of the indexing bar 30. At its inner end the pawl 50 provides the laterally inwardly projected tooth 52 for operative engagement with the teeth 40 of the indexing bar. Pawl 50 is provided with a forwardly extended, reduced width tail portion 53 and the carrier bar 60 is provided with a recess or cut out portion 63 which is extended inwardly through the inner side thereof beneath the tail 53 of pawl 50. Tail 53 is provided with a flange 54 depending from the inner side edge thereof, and a spring unit 55 is interposed between the depending flange 54 and the carrier bar 60 at the inner side of recess 63. This spring 55 is confined under compression between tail flange 54 and the carrier bar 60 and acts to continuously bias the tail 53 outwardly from bar 60 to maintain the tooth 52 and pawl 50 swung into operative indexing engagement in a notch 41 between adjacent teeth 40 of the series of teeth on the indexing bar 30.

The pawl carrier 60 on the indexing strokes thereof inwardly through slideway 61, is limited by the fixed stop provided by the abutment surface 62 across the inner end of the slideway which is positively engaged by the inner end of the carrier bar 60 at the conclusion of each indexing stroke of the bar. With the carrier bar 60 at the end of an indexing stroke, the pawl 50 thereon has the tooth 52 engaged in a notch 41 between adjacent teeth 40 of the indexing bar 30, as shown in Figs. 2 and 11. When the carrier bar 60 is moved outwardly in slideway 61 on its return stroke, tooth 52 of the pawl 50 rides upon the inclined surface 43 at the forward side of the notch 41 and cams the pawl 50 outwardly over the next forwardly adjacent tooth. As soon as tooth 52 clears the index tooth 40 it snaps back into the next forwardly adjacent notch 41 under the action of the biasing spring 55. The carrier bar 60 and its pawl 50 are then in position on the next indexing stroke thereof to effect indexing of the fixture table 20 to the next position of index, through engagement of the tooth 52 of pawl 50 against the surface 42 at the forward side of the next inwardly adjacent tooth 40. While the indexing stroke of the carrier bar 60 has a fixed end limit, by an important feature of our invention the end limit of outward movement of the carrier bar on its return stroke is variable automatically to adjust each return stroke to the particular spacing between adjacent teeth on an indexing bar as will be referred to and explained in detail hereinafter.

The pawl carrier 60 is positively reciprocated on its rearward, indexing strokes and on its forward, return strokes by an air cylinder and piston unit 70 which is mounted and secured in position at the underside of bed 10 by a bracket structure 71 suitably attached to the bed. The air cylinder unit 70 is located, in this example, at the right-hand side of bed 10 adjacent the forward edge thereof in position at the forward side of the work table W of the machine, as will be clear by reference to Figs. 1 and 2. Cylinder unit 70 is positioned with its axis generally perpendicular or at an angle to the straight line path of reciprocation of the pawl carrier 60 and includes, referring now to Fig. 14, the usual piston member 72 and piston rod or plunger 73, which latter extends outwardly from the inner end of the cylinder unit across and below the forwardly projected extension 10a of bed 10.

A bell crank unit 80 which includes a bored hub or body 81 having a long arm 82 extended radially from one end thereof and a short arm 83 extended radially from the opposite end thereof, is provided for operatively connecting the piston rod 73 of air cylinder unit 70 with the pawl carrier 60. The arms 82 and 83 of bell crank 80 are positioned thereon in this instance at right angles to each other, that is, at locations 90° apart around the axis of hub 81. This bell crank 80 is pivotally mounted on pivot screw 84 which is threaded at its upper end into the under side of extension 10a of bed 10 in vertical position depending therefrom and being spaced forwardly of piston rod 73. The pivot screw 84 has a head 84a at the lower end thereof and the bell bored hub 81 of bell crank 80 is rotatably mounted on pivot screw 84 in position between head 84a and bed 10, with the long arm 82 extended inwardly from the lower end of hub 81 and the short arm 83 extended from the upper end of hub 81 below and across the forward end of the slideway 61 in bed extension 10a and the pawl carrier 60 mounted in that slideway.

The outer end of the piston rod 73 of air cylinder unit 70 is pivotally coupled to the inner end of bell crank arm 82 by a coupling member or clevis 85. The extension 10a of bed 10 through which the slideway 61 extends is provided with an elongated opening 86 therethrough which is longitudinally centered with the axis of slideway 61, as will be clear by reference to Figs. 2 and 3. The forward end of the pawl carrier bar 60 is formed with an elongated opening or slot 87 therethrough disposed transversely of the bar and located with its transverse center aligned with the longitudinal axis of the bar. The short arm 83 of bell crank unit 80 is provided with a pivot pin receiving bore 83a therein and a pivot pin 90 is mounted on the upper side of arm 83 with the lower end thereof pivotally received and journalled in bore 83a. Pivot pin 90 is carried on and rocks with arm 83 and extends upwardly therefrom through slot or opening 86 in bed extension 10a. Pin 90 provides at its upper end a crank pin 91 which extends into and is slidably and rotatably received in the transverse slot 87 in the forward end of carrier bar 60.

With the pawl carrier bar 60 thus operatively coupled with the piston rod 73 of air cylinder 70, displacement of the rod 73 outwardly of the cylinder unit, that is inwardly across the machine, will rock the long arm 82 of bell crank 80 in a direction to swing the short arm 83 inwardly or rearwardly relative to the machine to thereby slide the pawl carrier 60 with pawl 50 thereon inwardly in slideway 61 to perform an indexing stroke. Displacement of rod 73 inwardly in the air cylinder unit 70 will effect rocking of the short arm 83 of bell crank 80 outwardly and thereby slide or draw carrier bar 60 with pawl 50, forwardly on the return stroke of the carrier bar and pawl preparatory to the next indexing stroke.

Referring now to Fig. 14, the air cylinder unit 70 is schematically shown as including inlet-outlet ports 74 and 75 therein located adjacent opposite ends of the cylinder at opposite sides, respectively, of piston 72. The air cylinder is controlled by an air valve unit 76 which is schematically shown as including a valve plunger 76a enclosed within a casing 76b. Valve plunger 76a is mounted for reciprocation under the control of solenoids 77 and 78 which have their respective armatures connected with opposite ends of the valve plunger. The solenoid 77 when energized draws plunger 76a to the position shown in Fig. 14, in which air under pressure is admitted by valve unit 76 to the outer side of piston 72 to displace the piston in a direction to actuate bell crank 80 to move carrier 60 on its indexing stroke. The air under pressure in such position of valve plunger 76a is supplied through pipe line 74a and inlet-outlet port 74. In such position of the valve plunger the cylinder at the opposite side of the piston 72 discharges to atmosphere through port 75, pipeline 75a, valve plunger 76a and discharge outlet 75b. When solenoid 77 is deenergized and solenoid 78 is energized, the valve plunger 76a is drawn thereby to position at the opposite end of casing 76b to then supply air under pressure through pipe line 75a and port 75, with port 74 and pipe line 74a then being placed in communication with discharge 74b of valve unit 76 for release of pressure air to atmosphere. With the valve unit 76 so set the piston 72 is displaced outwardly in the cylinder unit to thus actuate bell crank 80 in a direction to slide pawl carrier 60 outwardly on its return stroke.

The valve unit 76 is connected by a compressed air supply line 79 with any suitable source 79a of air under pressure. The solenoid 77 is connected with the power lines 77L and 78L by a circuit consisting of circuit lines 77a and 77b. The solenoid 78 is electrically connected into the power lines 77L and 78L by the circuit lines 78a and 78b.

Figure 4:
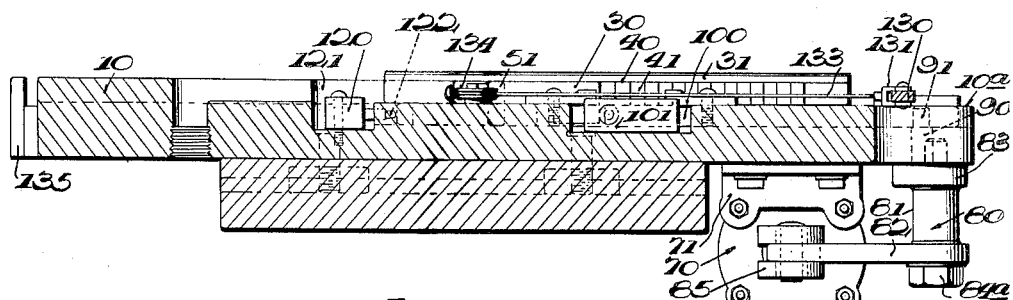
Fig. 4 is a vertical section taken as on the line 4—4 of Fig. 3.

An open-top pocket or recess 100 is formed in bed 10 (see Figs. 3 and 4) adjacent the inner side of slideway 61 with this pocket also opening laterally into the slideway. A micro switch 101 is secured in position in pocket 100 by removable clamps 102. Switch 101 has a laterally inwardly extended actuating member 103 which projects into the plane of the vertical forward side edge of the pawl tail flange 54 when the pawl is in position with the tooth 52 thereof engaged in a notch 41 of the index bar 39, as will be clear by reference to Fig. 3. The location of switch 101 is such that with the carrier bar 60 and its pawl 50 at the end limit of an indexing stroke, the rear vertical edge 54a of pawl flange 54 is positioned in immediate proximity to but spaced to the rear of the inner end of the switch actuating member 103. This switch 101 controls automatically the operation of the carrier bar 60 on its return stroke from the position assumed thereby at the completion of an indexing stroke. Switch 101 is connected into the circuit line 77b of the energizing circuit to the air valve solenoid 77, and is normally open to break this circuit and maintain solenoid 77 de-energized.

A starter switch 105 is connected into the circuit line 78b of the circuit to the solenoid 78 of the air valve unit 76. This starter switch 105 is of the normally open type for operation to close momentarily the circuit to solenoid 78. Starter switch 105 may be located at any convenient point but in the particular example hereof this switch 105 is mounted in position readily accessible to the operator at the forward side of the support structure of the copy table M, as shown in Fig. 1. This starter switch 105 controls the indexing cycle of the indexing mechanism for performing automatically a return stroke and an indexing stroke to thereby index fixture table 20 rearwardly on bed 10 from one position of index to the next position of index.

With the fixture table 20 of the unit in an indexed position, such as shown in Fig. 2, the pawl carrier bar 60 is at the end of its indexing stroke and the pawl 50 thereof is in position with its tooth 52 engaged in a notch 41 between adjacent teeth 40 on the indexing bar 39. When the operator desires to index fixture table 20 inwardly to its next position of index, he operates starter switch 105 to thereby momentarily close the circuit through solenoid 78 to momentarily energize that solenoid. Referring to Fig. 14, the energization of solenoid 78 will draw valve plunger 76a of valve unit 76 to position to discharge air under pressure at the inner side of piston 72 of air cylinder unit 70, while placing the cylinder at the opposite side of the piston in communication with atmosphere. Plunger 73 is thus drawn outwardly through the action of bell crank 80 which moves pawl carrier 60 outwardly in slideway 61 with the pawl 50 rocking over the next forwardly adjacent tooth 40 as the carrier bar moves forward as illustrated in Fig. 12. The pawl 50 is thus rocked about its pivot 51 to swing tail 53 and the tail flange 54 inwardly toward indexing bar 39 to position in which the tail flange 54 clears the inner end of the switch actuating member 103 of switch 101 as bar 60 and pawl 50 are moved forwardly. However, the instant that the pawl tooth 52 has cleared that tooth 40 over which it is forwardly riding, the tooth snaps inwardly into the next notch 41 with resulting swinging of tail flange 54 outwardly into contact with switch actuating member 103, as shown in Fig. 13. This contact operates member 103 to effect instant closing of switch 101, with the result that the circuit to solenoid 77 of the valve unit 76 is energized to instantly reset the plunger 76a of valve unit 76 to reverse the operation of the cylinder unit 70 to cause plunger 73 thereof to be forced outwardly to thereby rock bell crank 80 in a direction to move the pawl carrier 60 inwardly on its indexing stroke. Inward movement of pawl carrier 60 with tooth 52 of pawl 50 engaged against surface 42 of the next inwardly adjacent tooth results in moving the fixture table 20 inwardly to the next position of index as determined by the engagement of the inner end of carrier bar 60 against the abutment surface 62 at the inner end of the slideway 61. The indexing mechanism and the fixture table 20 then remain in this position of index until the next indexing cycle of return stroke and indexing stroke.

We provide for automatically, releasably locking the fixture table 20 in an indexed position through the medium of the gib 22. This automatic locking is effected by forcing the gib 22 inwardly under pressure into position with the surface 21a thereof clamped against the inclined, undercut surface 12a of slide 12 of bed 10. Referring now to Fig. 8 of the drawings in connection with Fig. 2, a lock pin 106 is reciprocally mounted in position extending through a bore 106a in fixture table 20. Bore 106a extends in this example from the left hand side edge of the table 20 inwardly therethrough to the slideway 21 thereof. The inner end of lock pin 106 is loosely received in a recess 106b formed in the adjacent side of gib 22, such recess presenting at its inner end an abutment surface for engagement by the end of the lock pin. The lock pin 106 is actuated and controlled by an air cylinder unit 107 which is mounted and supported from and which is movable as a unit with fixture table 20. In this instance air cylinder 107 is attached in position at the under side of an outwardly extended bracket 107a attached in position on the fixture table. If desired, as shown in Fig. 1, a suitable housing or casing 108 may be provided for enclosing this air cylinder unit 107.

The air cylinder 107, referring now to Fig. 14, includes a piston 109 reciprocal therein and attached to a piston rod 110 which extends axially therefrom at the inner end thereof in axial alignment with the lock pin 106. Lock pin 106 is suitably connected and coupled at its outer end to the inner end of the piston rod or plunger 110, so that reciprocation of the latter effects reciprocation of lock pin 106 in and through the bore 106a in the fixture table 20. The piston 109 is spring loaded by an expansion spring unit 111 which is mounted on piston rod 110 between piston 109 and the inner end of the cylinder unit. Spring unit 111 acts to continuously bias the piston and piston rod outwardly to thereby draw and maintain lock pin 107 moved outwardly from locking position clamping gib 22 against rail 12 of bed 10. Air cylinder 107 is, however, operated by air under pressure in the reverse or inward direction against the biasing forces of spring 111 to thereby force the lock pin 106 to clamp gib 22 against rail 12 and thereby securely lock fixture table 20 against displacement.

The air operation of cylinder 107 is through the medium of an air valve unit 112 which includes a casing 112a within which there is reciprocally mounted a valve plunger 112b having one end thereof connected to the armature of a solenoid 114. The outer end of air cylinder 107 is connected through an inlet-outlet port 115 with the air valve 112 by pipe line 116. The air valve 112 receives compressed air from the source 79a through pipe line 117. The air valve 112 as schematically shown in Fig. 14, is in position placing air cylinder 107 in communication for discharge to atmosphere through discharge 118. The valve plunger 112b is continuously spring biased to this position when the solenoid 114 is deenergized, by a contraction spring 119. When solenoid 114 is energized, valve plunger 112b is displaced against the forces of spring 119 to a position in which air under pressure flows through valve unit 112 from supply line 117 to the cylinder 107 to thereby displace piston 109 inwardly and force lock pin 106 inwardly to clamp gib 22 into position locking fixture table 20 to bed 10.

The automatic operation of the air cylinder 107 to effect locking and release of fixture table 20 to and from bed 10, is under the control of a microswitch 120 which is mounted in an open top pocket or recess 121 formed in bed 10 between guide rails 12 and 14. Switch 120 includes the switch actuating member 122 which extends horizontally forwardly therefrom through an opening 62a so that the end of member 122 projects through abutment surface 62 at the end of slideway 61 in line with and for engagement by the inner end of the slide carrier bar 60. The switch 120 is of the normally open type and is closed by inward displacement of the actuating member 122, the switch being spring loaded to restore to normal open position upon release therefrom of inwardly acting forces applied thereto.

The solenoid 114 for controlling the valve unit 112 of air cylinder 107 is connected into the power lines 77L and 78L by the circuit comprised of the circuit lines 114a and 114b, as will be clear by the diagrammatic disclosures of Fig. 14. The normally open microswitch 120 is in this instance connected in the circuit line 114b to the solenoid 114 so as to energize that solenoid when the switch is closed and to open the circuit and deenergize solenoid 114 when the switch is open.

The switch 120 is operated to closed position closing the circuit through and energizing solenoid 114 by the engagement of the inner end of carrier bar 60 with the switch actuating member 122 at the instant of engagement of the inner end of the carrier bar against the abutment surface 62 which determines the end limit of the indexing stroke of the carrier bar. The instant that the switch 120 is closed the solenoid 114 is energized and the valve plunger 112a is displaced to position opening the cylinder at the outer side of piston 109 to the compressed air supply line 117, so that compressed air is supplied to cylinder 107 through the valve unit 112, pipe 116 and port 115. The air pressure thus established in cylinder 107 forces the piston 109 and the piston rod 110 inwardly to thereby force the lock pin 106 to clamp gib 22 in position locking fixture table 20 against displacement. The gib 22 will remain in locked position held under pressure by the air cylinder unit 107, until the next return stroke of the carrier bar 60.

When the carrier bar 60 starts on its return stroke it does so of course independently of the locked fixture table 20 and as it moves outwardly in slideway 61 it disengages from and releases switch actuating member 122 so that the switch 120 then instantly restores to its normal open position. Opening of switch 120 results in deenergization of solenoid 114 and the spring 119 then takes over control of valve plunger 112a and resets that plunger to cut off compressed air supply to the cylinder unit 107 while placing that cylinder unit in communication with atmosphere. The spring 111 then takes over and forces piston 109 outwardly to release locking pin 106 from clamping engagement with the gib 22 thus releasing fixture table 20 in preparation for the next indexing step thereof.

We have thus provided for indexing the work holding fixture table 20 step by step through successive indexing positions under the control of the operator, with each indexing cycle from one indexing position to the next being automatic but initiated only at the will of the operator through the starter switch 105. And we have provided also for locking of the fixture table 20 automatically upon the instant that such table reaches an indexed position, with maintenance of such locking until release thereof automatically by the initial movement of the indexing mechanism on its return stroke. The fixture table 20 having removably mounted thereon a selected indexing bar, such as the bar 30 or the bar 30' of this example, is positioned for starting at the forward side of bed 10 as shown in Fig. 2 at the first position of index. In this starting position the switch 120 is closed by engagement of the inner end of the carrier bar 60 with the switch actuating member 122, and the locking mechanism is thus in locked position securely holding the table against displacement from its position of the index. When the operator wishes to index the fixture table 20 to its next position of index inwardly across bed 10, he merely momentarily actuates starter switch 105 and thereby initiates the automatic indexing cycle during which the locking mechanism is released and the carrier bar 60 and pawl 50 perform a return stroke and an indexing stroke to move table 20 inwardly a distance equal to the spacing between the adjacent teeth of the indexing bar then engaged by the pawl. Irrespective of tooth spacing on the particular indexing bar mounted on table 20, the indexing mechanism will automatically adjust the return stroke of carrier bar 60 and pawl 50 to the particular tooth spacing of that bar. The operator may continue to effect step by step indexing rearwardly of fixture table 20 through the positions of index as determined by the indexing bar by merely operating starter switch 105 whenever he desires to index the table from one position to the next. Such indexing may be continued until pawl 52 reaches the last notch of the indexing bar with the table then at its limit of movement rearwardly. Such position for the bar 30 and fixture table 20 being shown in Fig. 1. The fixture table 20 may thereafter be slid forwardly to the starting position for another cycle of rearward indexing. In order to permit of the return of fixture table 20 to its starting position at the forward side of bed 10, it is necessary to disengage pawl 50 from the teeth of the indexing bar and maintain the pawl so disengaged while the table is being slid forwardly to its starting position.

We have provided a form of pawl disengaging mechanism by which fixture table 20 may be released for movement forwardly on bed 10 to a starting position. Such mechanism in this example comprises a hand lever 130 which is mounted in horizontally disposed position at the forward side of bed 10 by a bracket 131 which mounts a vertical pivot pin 132 on which lever 130 is rotatably mounted for rocking thereof toward and from bed 10. A cable 133 connects the inner end of lever 130 with the forward end of pawl 50, this cable being extended rearwardly of pawl 50 along bed 10 to a pulley 134 around which it is extended to the forward end of the pawl to which the cable is attached. By swinging the outer end of lever 130 inwardly toward bed 10 cable 133 will rock pawl 50 about its pivot 51 to a position with the pawl tooth 52 disengaged from and clear of the teeth of the indexing bar mounted on fixture table 20. Pawl 50 is rocked to this engaged position against the forces of its biasing spring 55 and by holding lever 130 in its inwardly swung position with the pawl disengaged, the operator may manually slide fixture table 20 forwardly to its starting position. After the table is brought to starting position the operator merely releases lever 130 so as to permit the spring 55 to restore the pawl to indexing position engaged in the innermost notch of the indexing bar, such as the notch 41 of the bar 30 as shown in Fig. 2.

In order to prevent displacement of the fixture table 20 too far rearwardly, or completely from bed 10, we have provided a stop bracket or plate 135 attached to the rear vertical edge wall of bed 10. This stop plate 135 extends vertically upwardly above the plane of the top surface of bed 10 in position for engagement by the rear vertical wall of fixture table 20 and thereby limits rearward movement of the table.

Preferably a position indicator is provided by which the operator may visually check against a sample or facsimile template to determine the working position of the particular design being engraved at any time on a work piece, such as the work pieces R of this example. An example form of such an indicator as illustrated herein, is comprised by a bracket member 140 in the form of an angle bar secured along one side edge of fixture table 20, in this instance the right hand edge, with the flange 141 of bracket 140 being horizontally disposed along and extending outwardly from the fixture table. An indicator 142 is attached in fixed position on the right hand edge wall of bed 10 and extends outwardly therefrom below bracket 140 with the upper portion of this indicator being bent or extended inwardly over the upper side of flange 141 to provide the pointer 143. A template 144 having formed thereon an exact replica of the series of designs and the spacings therebetween to be formed on the work pieces R, is removably mounted in position on the upper side of bracket flange 142 with the first of the series of designs positioned under pointer 143 when the fixture table 20 is set in its forward, starting position as shown in Fig. 2. Thus as the table 20 is indexed rearwardly, the template 144 is correspondingly moved to successively bring the designs thereon under the pointer 143 to thus indicate visually to the operator the position of a work piece relative to the cutting tool.

In the example herein illustrated and described the power means for actuating the indexing mechanism and the power means for actuating the fixture table locking mechanism are each of the compressed air operated cylinder and piston type, but it is not intended by such examples to limit our invention to such types, as other air operated types may be utilized, as well as power units employing other actuating fluids than compressed air. Similarly, in its broader aspects our invention is not limited to the use of pressure fluid actuated power means, as other motive power forms capable of control by the indexing mechanism and by an operator in the combination and manner as required by our invention may be substituted.

It will also be evident that various other changes, variations, modifications, substitutions, eliminations and additions may be resorted to without departing from the broad spirit and scope of our invention and hence we do not intend or desire to limit our invention in all respects to the exact and specific disclosures of the example herein present, except as may be required by specific intended limitations thereto appearing in any of the claims hereto appended.

What we claim is:

1. In an indexing work fixture, in combination; a support structure; a table member movably mounted on said support structure for and being constrained to movements in either direction along a straight line path; an indexing bar removably attached to said table member in position parallel with the straight line path of movements of the table member; said indexing bar being provided along one side thereof with a series of indexing teeth spaced apart distances corresponding to the distances of spacing, respectively, between successive positions of index to which said table member is to be moved in one direction along said straight line path; indexing mechanism mounted on said support structure and including, a carrier member mounted for reciprocation along a straight line path parallel with the path of movements of said table member; and a pawl member pivotally mounted on said carrier member and being adapted to engage a tooth of said index bar on the indexing stroke in one direction of movement of said carrier member and to be moved into engagement with an adjacent tooth of said indexing bar on the return stroke of said carrier member in the reverse direction; operator controlled power means for operating said indexing mechanism; and means adapted to be operated automatically by said pawl member upon engagement of said pawl member on its return stroke with an adjacent tooth to arrest the movement of said indexing mechanism on its return stroke and to initiate automatically operation of said mechanism on an indexing stroke.

2. In an indexing work fixture, in combination; a support structure provided with spaced guide rails thereon; a table member provided with a slideway therein, said table member being mounted on said suport structure with said guide rails being slidably received in said slideway for movements of said table member thereon; indexing mechanism on said support structure adapted to engage said table member for sliding the latter in one direction on said guide rails step by step to successive positions of index; a locking member movably mounted on and carried by said table member and being positioned within said slideway for movements to and from locking position engaged against one of said guide rails to releasably lock said table member against movement; operating means on and movable as a unit with said table member for moving said locking member to locked position; and means adapted to be controlled by said indexing mechanism for actuation thereby when said table member is in a position of index for causing actuation of said locking member operating means.

3. In the combination as defined in claim 2 above; the locking member operating means being comprised by an actuating unit of the air operated type; operative connection between said unit and said locking member; a solenoid actuated air valve adapted to control operation of said unit; an electrical circuit for the solenoid of said valve unit; a normally open control switch in said circuit; and said indexing mechanism being adapted to engage said switch to close said circuit when said table member reaches a position of index.

4. In an indexing work fixture in combination; a support structure provided with spaced guide rails thereon; a table member provided with a slideway therein, said table member being adapted to be mounted on said support structure with said guide rails being slidably received in said slideway for movements of said table member in either direction thereon constrained to a straight line path thereby; an indexing bar removably attached in position at the inner side of said table member disposed longitudinally within said slideway between said guide rails; said indexing bar being provided along the inner side thereof with a series of spaced indexing teeth; a carrier bar reciprocally mounted in said support structure between said guide rails beneath said indexing bar on said table member; an indexing pawl pivotally mounted on said carrier bar at the inner side of said indexing bar for indexing engagement with the indexing teeth of said bar; and means on said support structure adapted for operation to reciprocate said carrier bar and pawl through an indexing stroke in one direction and a return stroke in the reverse direction.

5. In the combination as defined in claim 4 above; said indexing pawl being pivotally mounted for movements toward and from the indexing teeth of said indexing bar; said carrier bar reciprocating means including an air cylinder unit and a solenoid actuated control valve connected therewith; said air cylinder unit including a reciprocally mounted piston rod operatively coupled with said carrier bar and being adapted on reciprocation in one direction to move said bar on an indexing stroke and on reciprocation in the reverse direction to move said bar on a return stroke; electrical circuits to said solenoid control valve; and a control switch connected in said circuits and being mounted on said support structure in position for actuation by said pawl as the latter is moved with said carrier bar on a return stroke of the said bar to cause said cylinder unit to reciprocate said carrier bar in the reverse direction on an indexing stroke.

6. In an indexing work fixture, in combination; a support structure; a table member slidably mounted on said support structure for movements thereon in either direction along a straight line path; an indexing bar attached on said table member and being provided along one side thereof with a series of spaced indexing teeth; a carrier bar reciprocally mounted on said support structure in position beneath said indexing bar on said table member; an indexing pawl pivotally mounted on and reciprocal with said carrier bar; said pawl being mounted in position adjacent and being rockable to and from indexing engagement with the teeth on said bar; means on said support structure for reciprocating said carrier bar and pawl in one direction to perform an indexing stroke thereof and in the opposite direction to perform a return stroke; control means adapted to be engaged with and actuated by said pawl at the end of the return stroke of said carrier bar to cause reversal of operation of said reciprocating means to perform an indexing stroke of said carrier and pawl; and an operator actuable control means for initiating operation of said carrier bar reciprocating means to move said bar and pawl on a return stroke.

7. In an indexing work fixture, in combination;

a support structure; a table member movably mounted on said support structure for movements to successive positions of index thereon; a groove formed in the under side of said table member parallel with the path of movements of the said table member on said supporting structure; and an indexing bar having an attaching rib thereon adapted to be slidably received in said table member groove for removably mounting said indexing bar in position on said table; and means on said table for releasably attaching said indexing bar in mounted position.

8. In an indexing work fixture, in combination; a support structure; a table member slidably mounted on said support structure for movements in either direction along and constrained to a straight line path; indexing mechanism mounted on said support structure and including a reciprocatory member for engaging said table member on an indexing stroke thereof to move said table member from one position to the next position of index, said reciprocatory member on the return stroke thereof in the reverse direction being adapted to be positioned for engaging said table member on the next indexing stroke; an air cylinder unit mounted on said support structure, said air cylinder unit including a reciprocating piston rod operatively connected with said reciprocatory member of said indexing mechanisms for reciprocating said member; an air control valve connected with said cylinder unit and being operable to one position for effecting reciprocation of said piston rod in one direction and to another position for effecting reciprocation of said rod in the reverse direction; a solenoid for actuating said valve unit to said one position; a second solenoid for actuating said valve unit to said other position; an electrical circuit for said first mentioned solenoid; an electrical circuit for said second mentioned solenoid; a normally open switch in said first solenoid circuit adapted to be actuated by an operator to close said circuit; a normally open switch in said second solenoid circuit adapted to be actuated to close said second solenoid to reset said valve unit to position for reversing said cylinder unit, and said switch in said second solenoid circuit being adapted to be actuated automatically by said indexing mechanism at the end of its movement on a return stroke thereof.

9. In an indexing work fixture, in combination; a support structure; a table member movably mounted thereon; an indexing bar removably secured on said table member, said indexing bar having a series of indexing teeth thereon with successive teeth of said series being spaced apart distances corresponding to the distances of spacing between successive positions of index, respectively, of said table member; a carrier member reciprocally mounted on said support structure; an indexing pawl pivotally mounted on said carrier member and being adapted for indexing engagement with successive teeth of said indexing bar; variable stroke, reversible power means connected with said carrier member for reciprocating said member through selected predetermined length indexing and return strokes; normally inactive control means connected with said power means and being operable during a return stroke of said carrier member to effect a reverse operation of the power means; said control means including a normally inactive operating member adapted to be actuated to operate said control means; and said operating member being positioned to be engaged and actuated by said pawl member during a return stroke thereof when the pawl member arrives in position in indexing engagement with the next adjacent tooth on said indexing bar.

10. In an indexing work fixture, in combination; a support structure; a table member movably mounted on said support structure; indexing mechanism mounted on said support structure and being adapted to move said table member progressively step by step in one direction to successive positions of index spaced varying distances apart; of a selected series of positions of index; an indexing bar removably attached to said table member and having thereon a series of indexing teeth spaced apart therealong distances corresponding to the distances of spacing between the successive positions of index, respectively, of the selected series of index positions through which said table member is to be moved; said indexing mechanism including an actuating member operable thereby through an indexing stroke and a return stroke and being adapted to engage a tooth of said indexing bar on each indexing stroke thereof; and means operatively associated with and adapted to be controlled by said actuating member on each return stroke thereof to cause said indexing mechanism to arrest automatically the return stroke of the actuating member when the latter has been moved to a position of indexing engagement with the next adjacent tooth of said indexing bar.

11. In an indexing work fixture, in combination; a support structure; a table member mounted so said support structure for movements to successive positions of index thereon; variable stroke indexing mechanism mounted on said support structure and being adapted to effect indexing movements of said table member progressively step by step in one direction to successive positions of index spaced varying distances apart; an indexing bar removably mounted on said table member and being formed to provide a series of indexing teeth spaced apart therealong distances corresponding to the distances of spacing between the successive positions of index, respectively, through which said table member is to be moved; power means for operating said variable stroke indexing mechanism; said indexing mechanism including an indexing member operable thereby through a variable indexing stroke in engagement with one of the teeth on said indexing bar and through a variable return stroke for engagement with the next adjacent tooth of said bar; and control means operatively connected with said power means and being adapted to be actuated by said indexing member when said indexing member reaches a position on its return stroke in indexing engagement with an adjacent tooth to cause such power means to arrest the return stroke and to initiate automatically an indexing stroke of the indexing member of said indexing mechanism.

12. In an indexing work fixture, in combination; a support structure; a table member movably mounted on said support structure; indexing mechanism mounted on said support structure and including an indexing member operable through variable indexing and return strokes adapted to be engaged with said table member to move the table member progressively in one direction step by step to successive positions of index spaced varying distances apart; power means connected with said indexing mechanism and being adapted for selective operation to selectively actuate said indexing member through variable strokes thereof; control means operatively connected with said power means for causing operation of said power means to actuate said indexing member; and means on said work table adapted to operatively engage said control means to cause operation of said power means to arrest a return stroke of said indexing member and initiate an indexing stroke thereof when said indexing member has moved on its return stroke a distance equal to the spacing between the position of index to which said table member has been moved and the next successive position of index.

13. In an indexing work fixture, in combination; a support structure; a table member mounted on said support structure for movements progressively in one direction to successive positions of index thereon; indexing mechanism adapted for operation to move said work table progressively step by step to successive positions of index; said indexing mechanism being mounted on said support structure and including an indexing pawl operable through an indexing stroke; an indexing bar removably attached to said work table and having a series of indexing teeth spaced apart thereon adapted to be engaged successively by said indexing pawl to move said work table from one position of index to the next position of index; locking mechanism operable to and from position releasably locking said work table in each position of index; and control means operatively associated with said locking mechanism adapted to be actuated automatically by said indexing mechanism when said table member reaches a point of index to cause operation of said locking mechanism to releasably lock the table in such position of index.

14. In the combination as defined in claim 11 above; said power means being comprised by an air cylinder unit including a piston rod adapted to be reciprocated thereby; said piston rod being operatively coupled with said indexing mechanism for effecting operation of said indexing mechanism through an indexing stroke or a return stroke; a solenoid actuated air control valve connected with said air cylinder unit; electrical circuits for said control valve; and said control means being comprised by switches connected in said electrical circuits, one of said switches being adapted for operator actuation and the other of said switches being adapted for actuation automatically by said indexing mechanism on a return stroke thereof.

References Cited in the file of this patent

UNITED STATES PATENTS

| Number | Name | Date |
|---|---|---|
| 512,829 | Hunter | Jan. 16, 1894 |
| 1,110,751 | Doner | Sept. 15, 1914 |
| 1,175,195 | Thomas | Mar. 14, 1916 |
| 2,005,696 | Groton et al. | June 18, 1935 |
| 2,090,649 | Tetreault | Aug. 24, 1937 |
| 2,249,989 | Harley | July 22, 1941 |
| 2,371,675 | Cherry et al. | Mar. 20, 1945 |

FOREIGN PATENTS

| Number | Country | Date |
|---|---|---|
| 600,150 | Great Britain | Apr. 1, 1948 |